US008662693B2

(12) United States Patent
Huang (10) Patent No.: US 8,662,693 B2
(45) Date of Patent: Mar. 4, 2014

(54) BACKLIGHT MODULE AND DISPLAY DEVICE UTILIZING THE SAME

(75) Inventor: Sheng-Bei Huang, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 350 days.

(21) Appl. No.: 13/181,504

(22) Filed: Jul. 12, 2011

(65) Prior Publication Data

US 2012/0170250 A1    Jul. 5, 2012

(30) Foreign Application Priority Data

Dec. 30, 2010    (TW) ................................ 99147025 A (51) Int. Cl.
*F21V 7/04*    (2006.01)
*G09F 13/04*    (2006.01)

(52) U.S. Cl.
USPC ............ 362/97.4; 362/97.1; 362/634; 349/58

(58) Field of Classification Search
USPC .............................. 362/97.1–97.4, 632–634, 362/217.1–217.17; 349/58, 60, 62, 64, 67
See application file for complete search history.

(56) References Cited

U.S. PATENT DOCUMENTS

| 7,517,134 | B2 * | 4/2009 | Hu ................................ 362/633 |
| 7,780,333 | B2 * | 8/2010 | Hsu et al. ...................... 362/633 |
| 7,973,872 | B2 * | 7/2011 | Kim et al. ....................... 349/58 |
| 8,111,351 | B2 * | 2/2012 | Cho et al. ........................ 349/62 |
| 8,550,688 | B2 * | 10/2013 | Seo et al. ...................... 362/633 |
| 2002/0080298 | A1 * | 6/2002 | Fukayama ...................... 349/58 |
| 2006/0007708 | A1 * | 1/2006 | Lee ................................ 362/632 |
| 2009/0046217 | A1 * | 2/2009 | Fukayama ...................... 349/58 |

FOREIGN PATENT DOCUMENTS

| JP | 2001084821 | 3/2001 |
| JP | 2008145655 | 6/2008 |

* cited by examiner

*Primary Examiner* — Bao Q Truong
(74) *Attorney, Agent, or Firm* — Winston Hsu; Scott Margo (57) ABSTRACT

A backlight module includes a back cover, an optical film assembly, a reflective sheet, a frame and a fixing member. The optical film assembly is disposed on the back cover. The optical film assembly has a first protruding portion and a first hole is formed on the first protruding portion. The reflective sheet is disposed between the back cover and the optical film assembly. The reflective sheet has a second protruding portion disposed in the first hole of the first protruding portion. The frame is disposed beside the back cover. A first end of the fixing member is fixed on the second protruding portion of the reflective sheet. A second end of the fixing member is fixed on the frame.

18 Claims, 14 Drawing Sheets

BACKLIGHT MODULE AND DISPLAY DEVICE UTILIZING THE SAME

BACKGROUND OF THE INVENTION

1. Field of the Invention

The invention relates to a backlight module and, more particularly, to a backlight module capable of fixing an optical film assembly effectively and a display device utilizing the same.

2. Description of the Prior Art

Since a liquid crystal display (LCD) has advantages of thin thickness, light weight, low power consumption, no radiation pollution, and being compatible with semiconductor process, it has been applied in various electronic devices including notebook, mobile phone, digital still camera, personal digital assistant, and so on. The LCD utilizes a backlight module to provide light for a display panel so as to display images. In general, an optical film assembly is disposed in the backlight module and used to improve optical characteristics of light. The optical film assembly may comprise lots of optical films including a prism film, a diffusing film, and so on.

Figure 1:
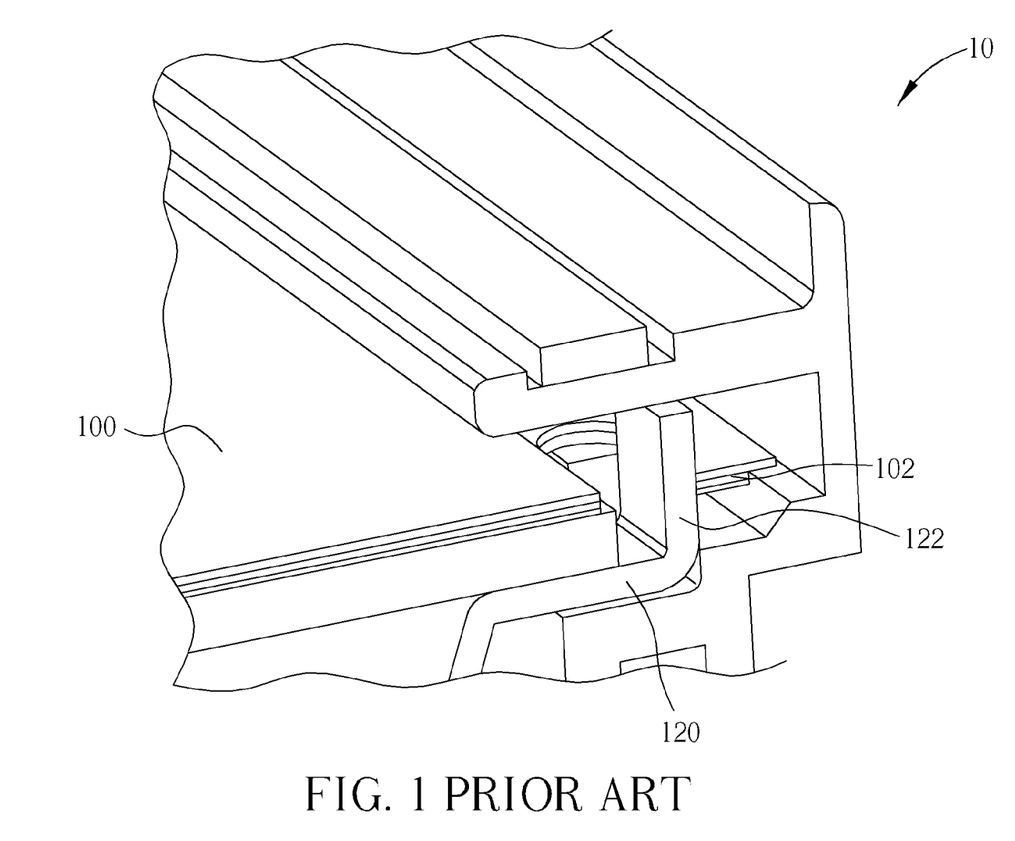
FIG. 1 is a partial schematic diagram illustrating a backlight module of the prior art.
Figure 2:
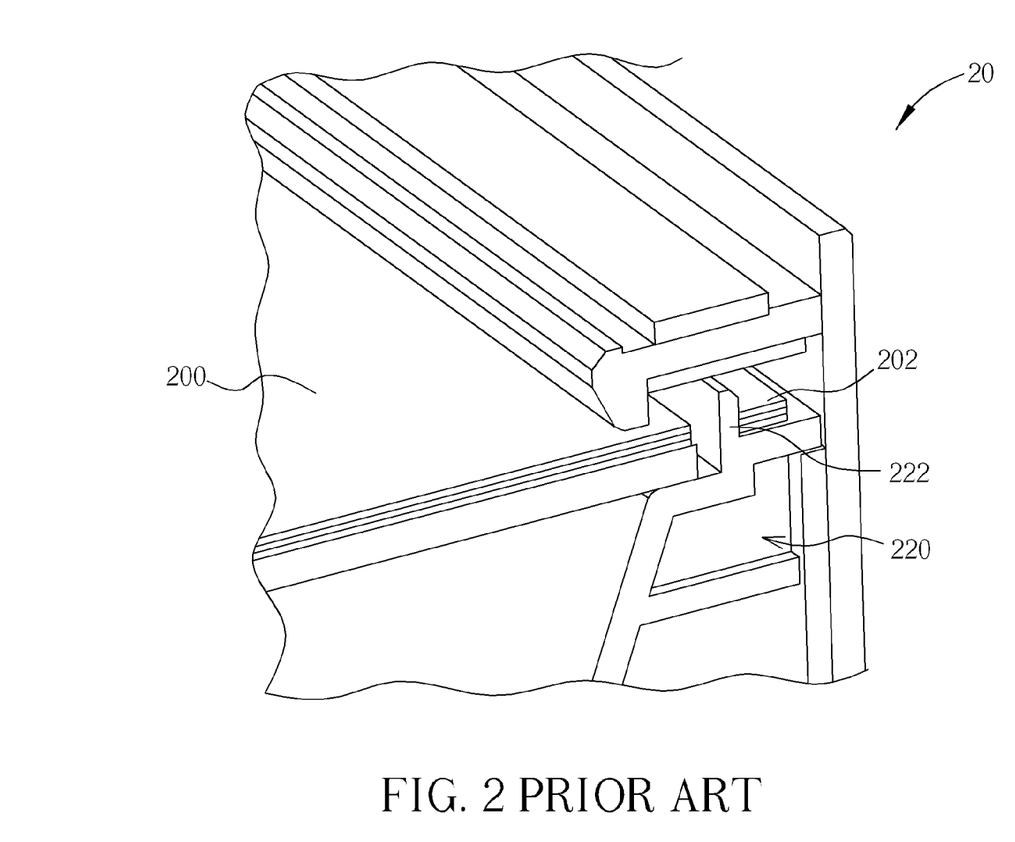
FIG. 2 is a partial schematic diagram illustrating a backlight module of the prior art.

Referring to FIGS. 1 and 2, FIG. 1 is a partial schematic diagram illustrating a backlight module 10 of the prior art, and FIG. 2 is a partial schematic diagram illustrating a backlight module 20 of the prior art. As the backlight module 10 shown in FIG. 1, a protruding portion 102 of an optical film assembly 100 is hung on a bending portion 122 of a back cover 120. As the backlight module 20 shown in FIG. 2, a protruding portion 202 of an optical film assembly 200 is hung on a protuberance 222 of a plastic frame 220. Therefore, when a large size display device equipped with the backlight module 10 or 20 stands or faces down, the optical film assembly 100 or 200 will not fall off a frame of the backlight module 10 or 20. Furthermore, some prior arts embed cupper pillar in a back cover to hang an optical film assembly.

However, the aforesaid structures for fixing the optical film assembly always have a specific thickness (at least more than one millimeter), so they may occupy much space in the display device. In addition, most of the back covers are made of metal. If there are bending portions bended from the back cover, not only the span between the bending portions cannot be controlled easily but also the deckle edges of the bending portions may cut off the optical film due to vibration or collision. Moreover, there is always a gap between the bending portion and the frame, so dust may enter the backlight module through the gap. On the other hand, if the optical film assembly is fixed by the protuberance of the plastic frame, the plastic frame has to be designed in relation to the back cover. The plastic frame usually consists of an upper frame and a lower frame, such that the amount of molds increases and then the manufacturing cost increase correspondingly. As to the fixing manner of embedding cupper pillar, it will raise the cost of parts and expend large working hours and the optical film may be cut off due to single contact force.

SUMMARY OF THE INVENTION

An objective of the embodiment is to provide a backlight module and a display device utilizing the same so as to solve the aforesaid problems.

According to one embodiment, a backlight module comprises a back cover, an optical film assembly, a reflective sheet, a frame and a fixing member. The optical film assembly is disposed on the back cover. The optical film assembly has a first protruding portion and a first hole is formed on the first protruding portion. The reflective sheet is disposed between the back cover and the optical film assembly. The reflective sheet has a second protruding portion disposed in the first hole of the first protruding portion. The frame is disposed beside the back cover. A first end of the fixing member is fixed on the second protruding portion of the reflective sheet and a second end of the fixing member is fixed on the frame.

According to another embodiment, a display device comprises a backlight module and a display panel. The display panel is disposed on the backlight module. The structural design of the backlight module is mentioned in the above.

As mentioned in the above, the embodiment disposes the protruding portion of the reflective sheet in the hole formed on the protruding portion of the optical film assembly and fixes opposite ends of the fixing member on the reflective sheet and the frame beside the back cover respectively. Accordingly, the embodiment can fix the optical film assembly in the backlight module effectively.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
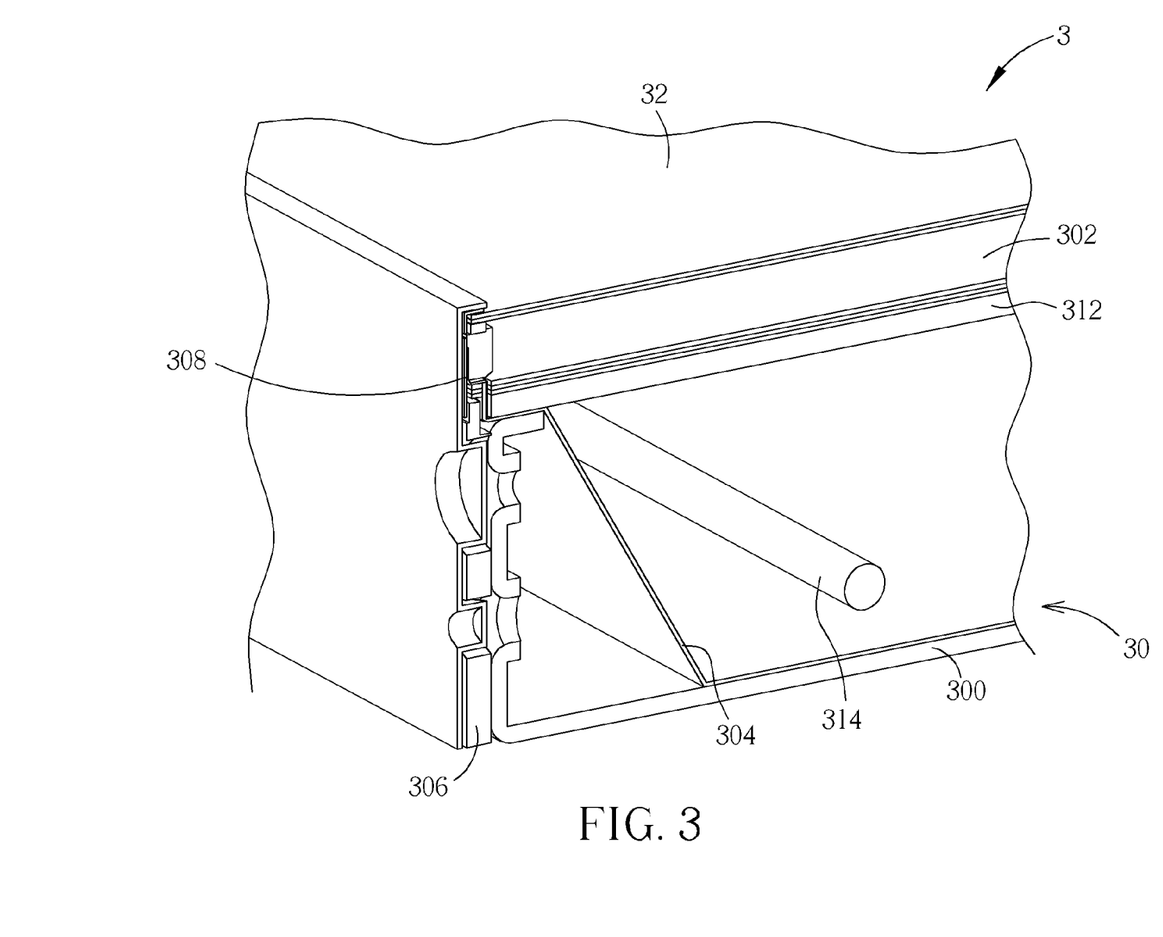
FIG. 3 is a partial schematic diagram illustrating a display device according to one embodiment.
Figure 4:
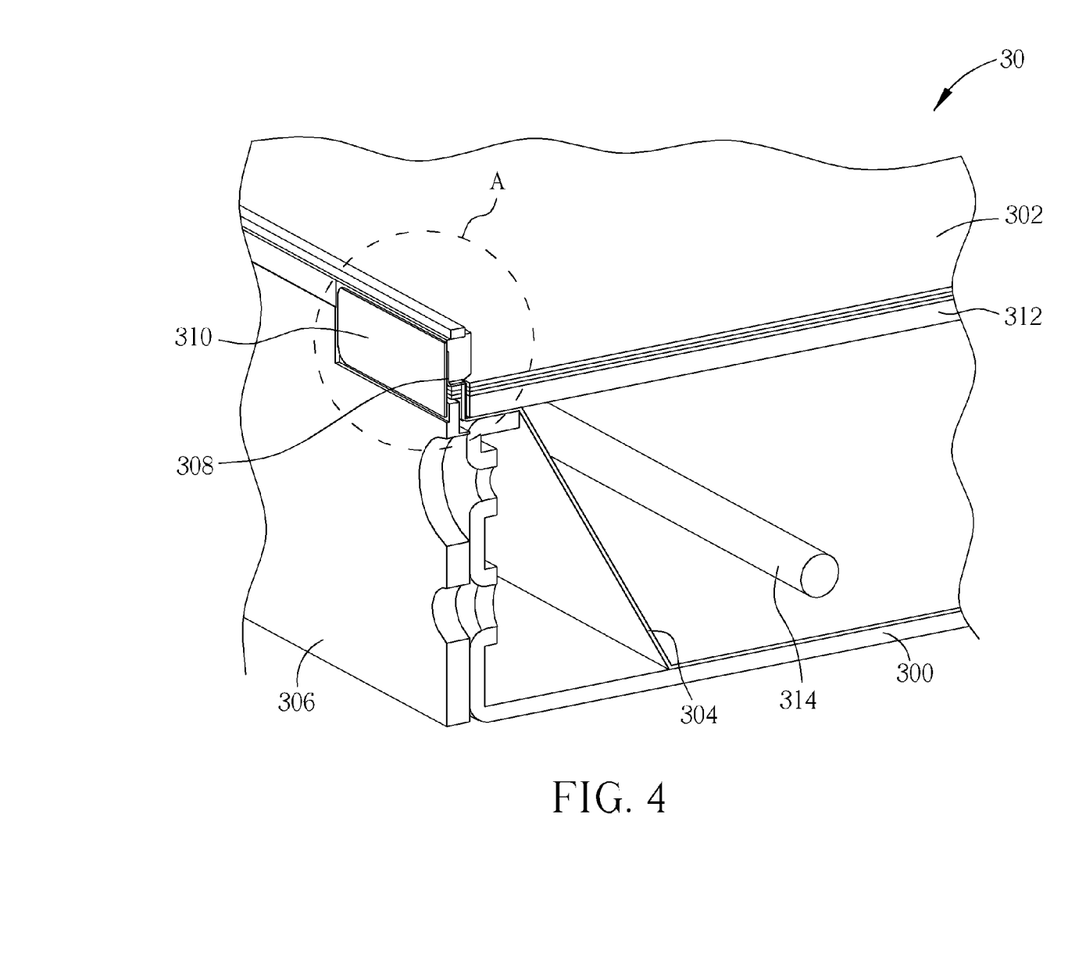
FIG. 4 is a partial schematic diagram illustrating the backlight module shown in FIG. 3.
Figure 5:
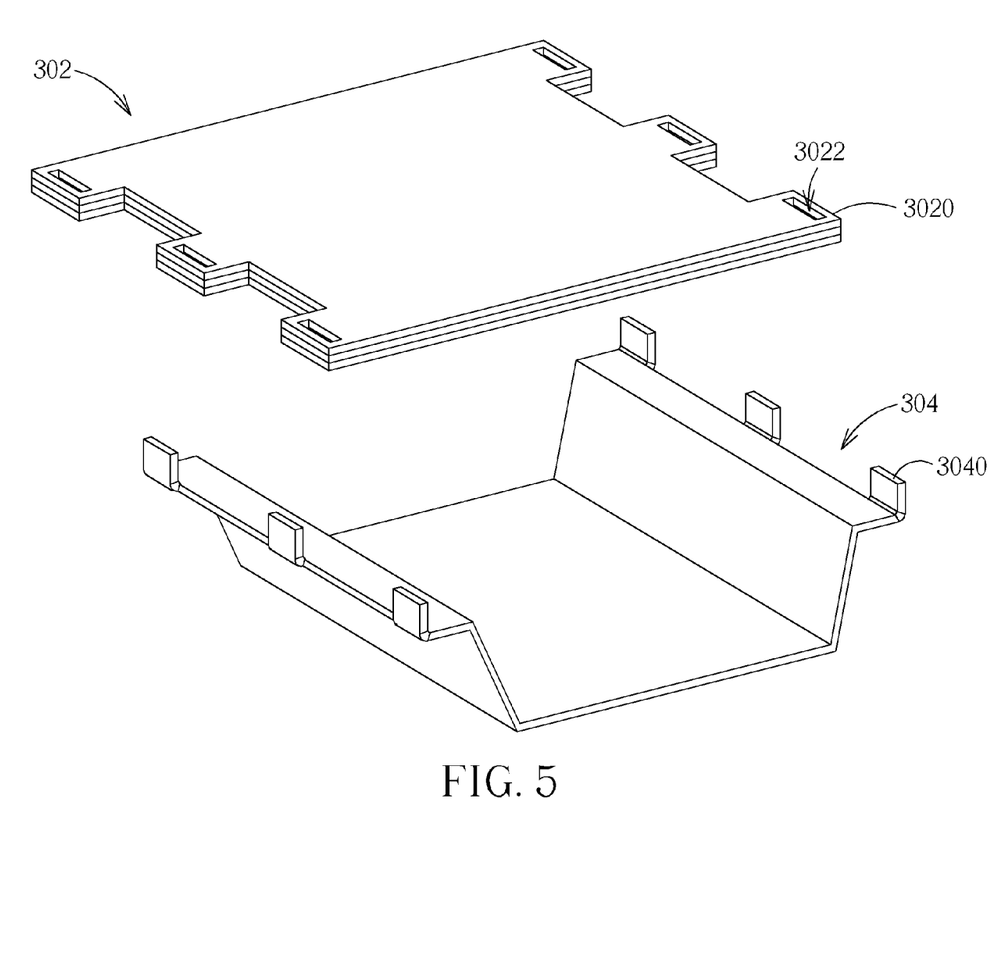
FIG. 5 is an exploded view illustrating the optical film assembly and the reflective sheet shown in FIG. 4.
Figure 6:
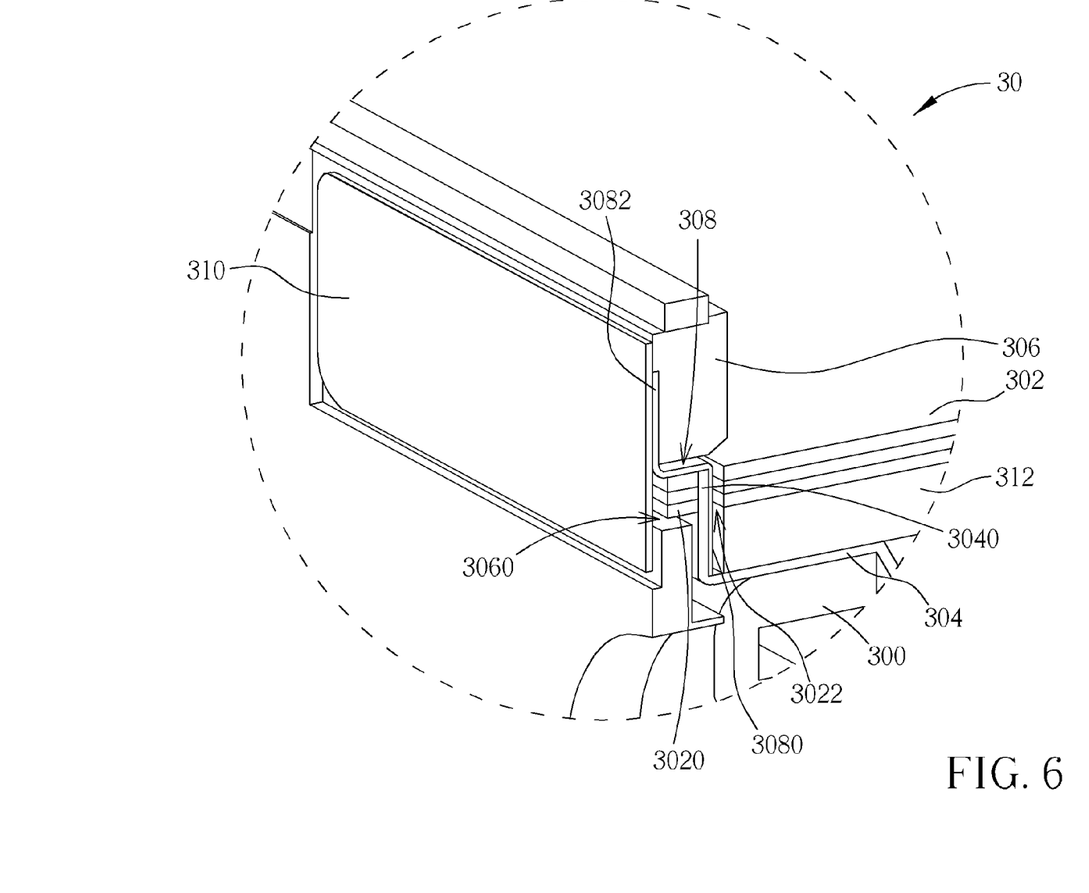
FIG. 6 is an enlarged view illustrating the area A shown in FIG. 4.

Referring to FIGS. 3 to 6, FIG. 3 is a partial schematic diagram illustrating a display device 3 according to one embodiment, FIG. 4 is a partial schematic diagram illustrating the backlight module 30 shown in FIG. 3, FIG. 5 is an exploded view illustrating the optical film assembly 302 and the reflective sheet 304 shown in FIG. 4, and FIG. 6 is an enlarged view illustrating the area A shown in FIG. 4.

As shown in FIG. 3, the display device 3 comprises a backlight module 30 and a display panel 32. The display panel 32 is disposed on the backlight module 30. In practical applications, the display panel 32 may be, but not limited to, a liquid crystal display (LCD) panel. The display device 3 utilizes the backlight module 30 to provide light for the display panel 32 so as to display images.

As shown in FIG. 4, the backlight module 30 may comprise a back cover 300, an optical film assembly 302, a reflective sheet 304, a frame 306, a fixing member 308, a dustproof member 310, a diffusing plate 312 and a plurality of light sources 314. In this embodiment, the backlight module 30 is exemplified by, but not limited to, a direct type backlight module. The optical film assembly 302 and the diffusing plate 312 are disposed on the back cover 300. The reflective sheet 304 and the light sources 314 are disposed between the back cover 300 and the optical film assembly 302. The light sources 314 are disposed on the reflective sheet 304. The optical film assembly 302 may comprise lots of optical films including a prism film, a diffusing film, a hybrid optical film, and so on. The frame 306 may be made of plastic, metal (e.g. aluminum) or other appropriate materials. The light source 314 may be cold cathode fluorescent lamp (CCFL) or light emitting diode (LED). The fixing member 308 and the dustproof member 310 may be, but not limited to, a film (e.g. mylar). It should be noted that the hardness of the diffusing plate 312 may be larger than the hardness of each film of the optical film assembly 302, so as to support the optical film assembly 302.

As shown in FIG. 5, there is a plurality of first protruding portions 3020 extended from edges of the optical film assembly 302 and there is a plurality of first holes 3022 formed on the first protruding portions 3020 respectively. Furthermore, there is a plurality of second protruding portions 3040 extended from edges of the reflective sheet 304 and corresponding to the first protruding portions 3020.

As shown in FIG. 6, the second protruding portion 3040 of the reflective sheet 304 is disposed in the first hole 3022 of the first protruding portion 3020 of the optical film assembly 302. The frame 306 is disposed beside the back cover 300. In this embodiment, a second hole 3060 is formed on the frame 306 and is corresponding to one side of the optical film assembly 302. The first protruding portion 3020 of the optical film assembly 302 is accommodated in the second hole 3060 of the frame 306. A first end 3080 of the fixing member 308 passes through the first hole 3022 of the first protruding portion 3020 to be fixed on the second protruding portion 3040 of the reflective sheet 304. A second end 3082 of the fixing member 308 passes through the second hole 3060 to be fixed on an outer wall of the frame 306. Accordingly, the optical film assembly 302 can be fixed in the backlight module 30 effectively. Moreover, the dustproof member 310 can be attached on the outer wall of the frame 306 so as to cover the second hole 3060. Accordingly, the dustproof member 310 can prevent dust from entering the backlight module 30 through the second hole 3060.

Figure 7:
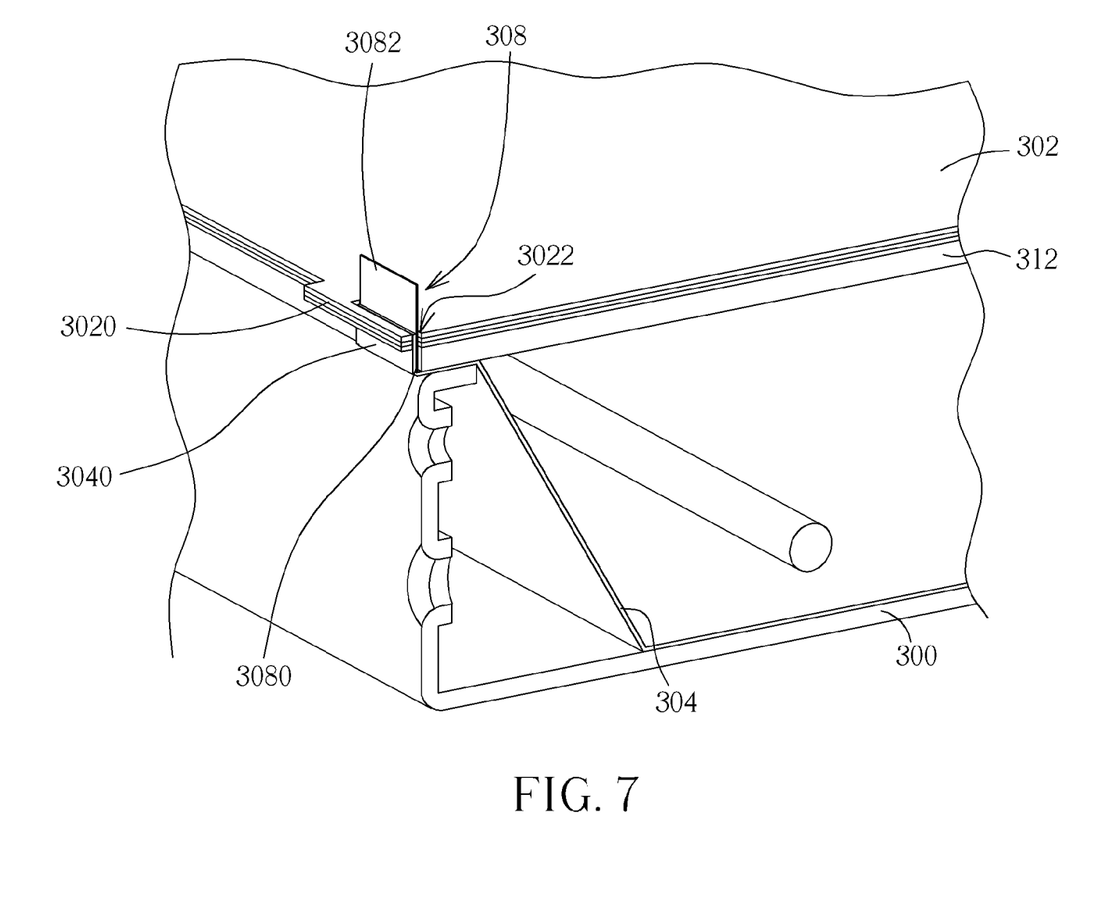
FIGS. 7 to 10 are schematic diagrams illustrating the assembly processes of the backlight module shown in FIG. 4.
Figure 8:
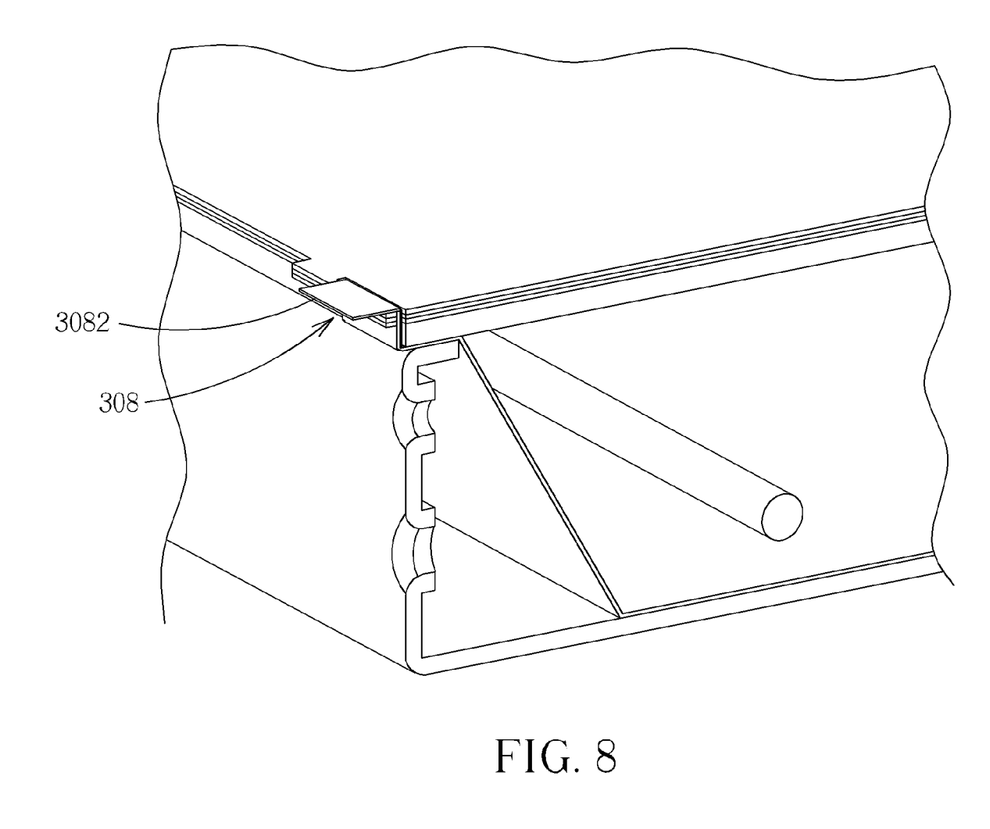
Figure 9:
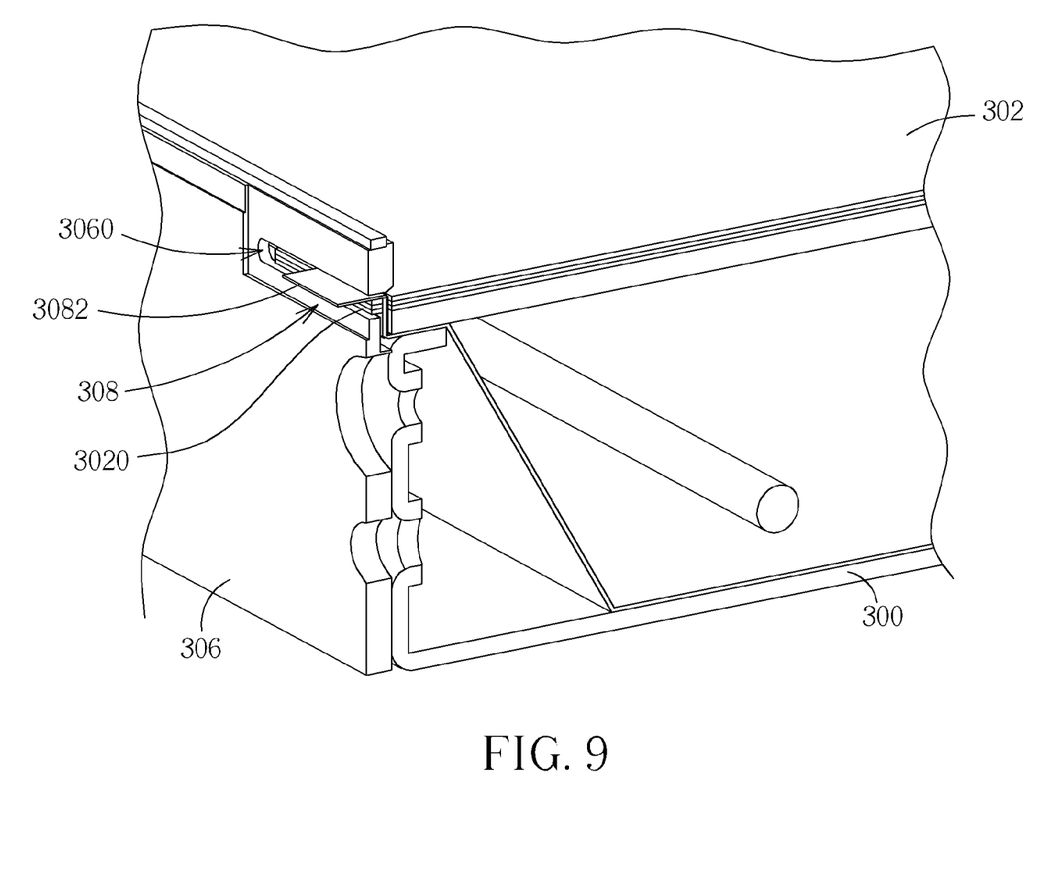
Figure 10:
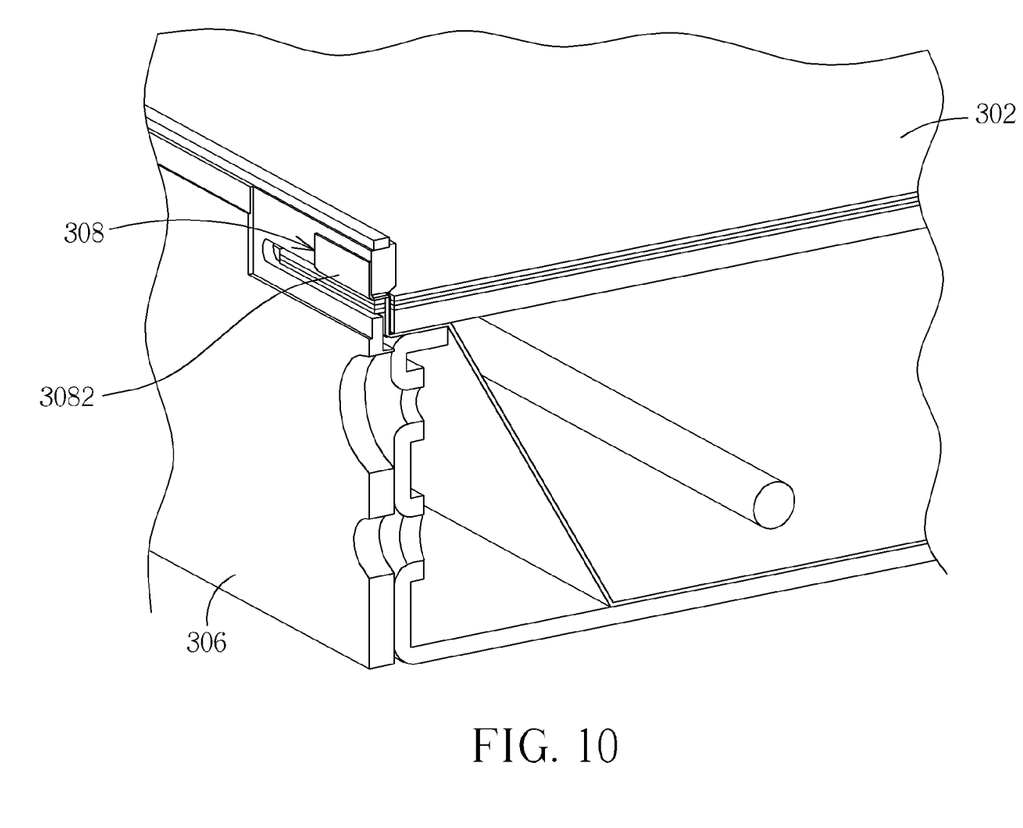

Referring to FIGS. 7 to 10, FIGS. 7 to 10 are schematic diagrams illustrating the assembly processes of the backlight module 30 shown in FIG. 4. First of all, as shown in FIG. 7, after the reflective sheet 304, the diffusing plate 312 and the optical film assembly 302 are disposed on the back cover 300 in sequence, the second protruding portion 3040 of the reflective sheet 304 is disposed in the first hole 3022 of the first protruding portion 3020 of the optical film assembly 302 and the first end 3080 of the fixing member 308 passes through the first hole 3022 of the first protruding portion 3020 to be fixed on the second protruding portion 3040 of the reflective sheet 304. Afterward, as shown in FIG. 8, the second end 3082 of the fixing member 308 falls down. Afterward, as shown in FIG. 9, the frame 306 is disposed beside the back cover 300, such that the first protruding portion 3020 of the optical film assembly 302 is accommodated in the second hole 3060 of the frame 306 and the second end 3082 of the fixing member 308 passes through the second hole 3060. Afterward, as shown in FIG. 10, the second end 3082 of the fixing member 308 is fixed on the outer wall of the frame 306. Finally, as shown in FIG. 6, the dustproof member 310 is attached on the outer wall of the frame 306 so as to cover the second hole 3060. Accordingly, the backlight module 30 is assembled completely.

Figure 11:
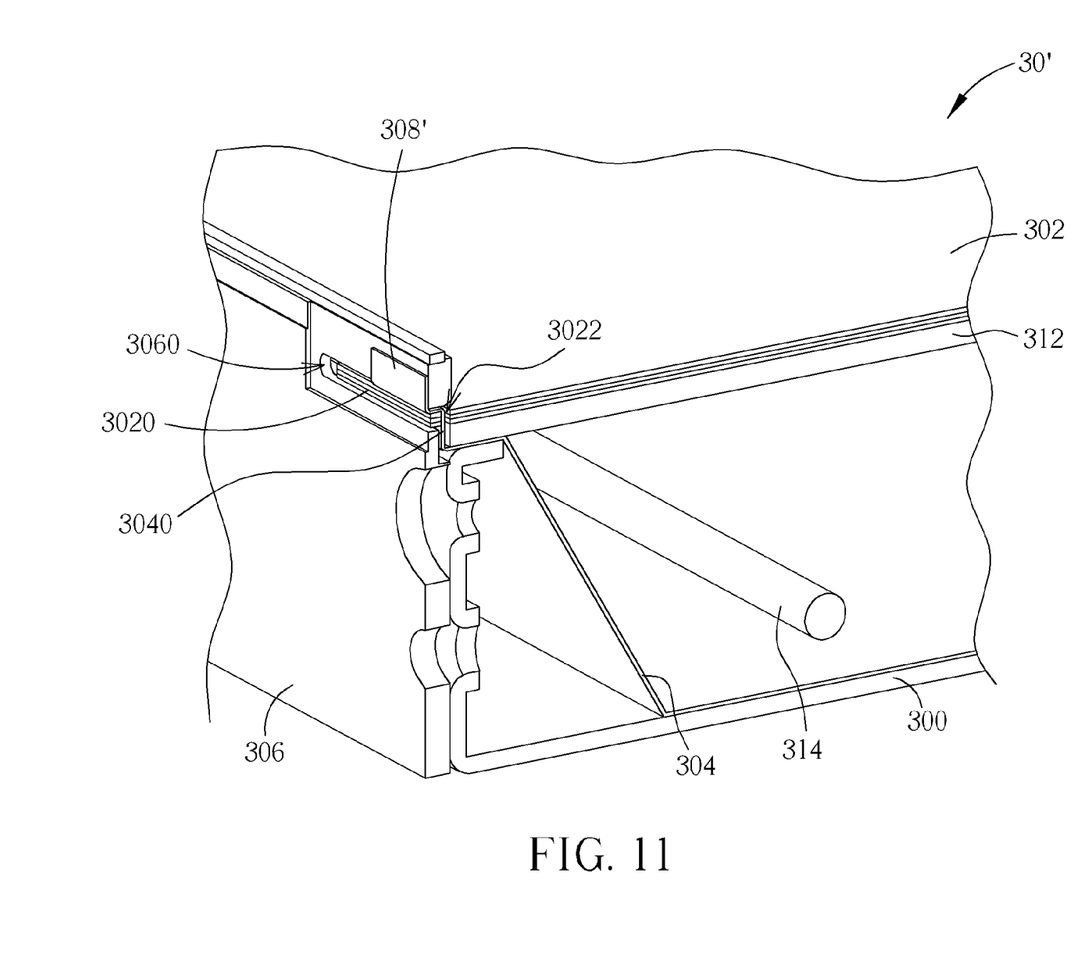
FIG. 11 is a schematic diagram illustrating a backlight module according to another embodiment.

Referring to FIG. 11, FIG. 11 is a schematic diagram illustrating a backlight module 30' according to another embodiment. As shown in FIG. 11, the main difference between the backlight module 30' and the aforesaid backlight module 30 is that the fixing member 308' of the backlight module 30' and the second protruding portion 3040 of the reflective sheet 304 are formed integrally. In other words, the fixing member 308' is extended from the second protruding portion 3040 of the reflective sheet 304 and passes through the first hole 3022 of the optical film assembly 302 and the second hole 3060 of the frame 306 so as to be fixed on the outer wall of the frame 306. It should be noted that the same elements in FIG. 11 and FIGS. 3 to 10 are represented by the same numerals, so the repeated explanation will not be depicted herein.

Figure 12:
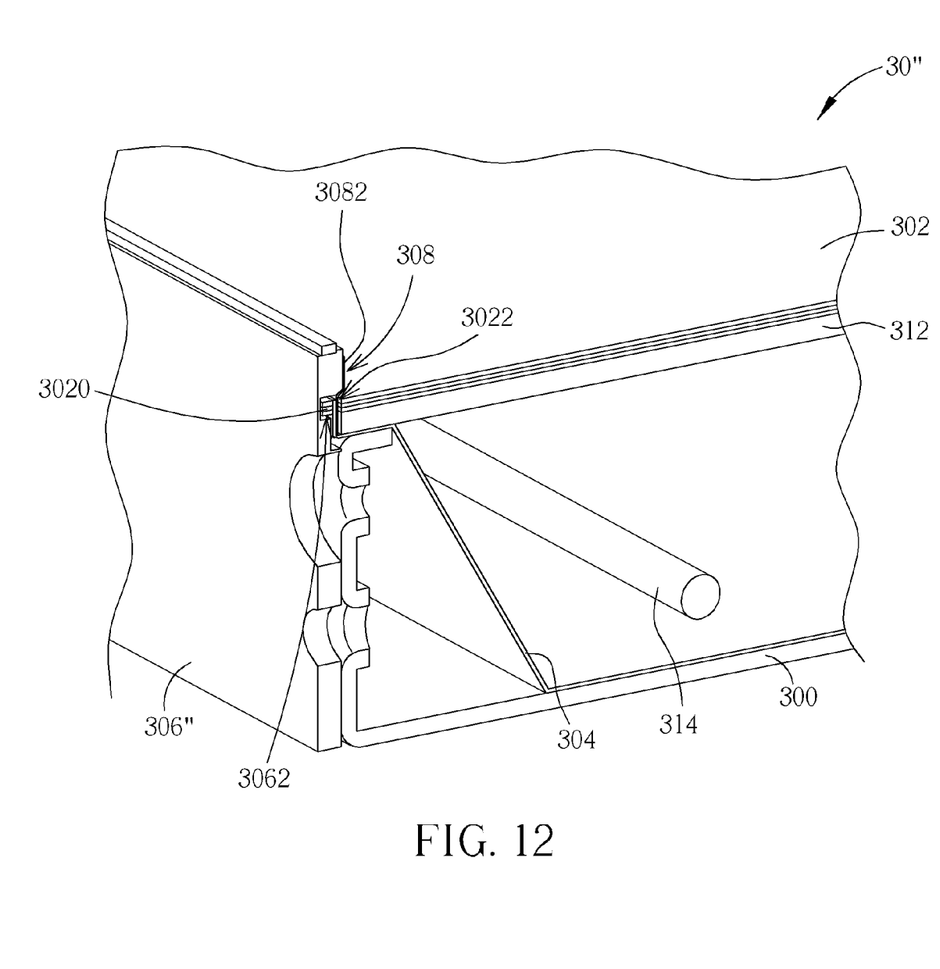
FIG. 12 is a schematic diagram illustrating a backlight module according to another embodiment.

As shown in FIG. 12, FIG. 12 is a schematic diagram illustrating a backlight module 30" according to another embodiment. As shown in FIG. 12, the main difference between the backlight module 30" and the aforesaid backlight module 30 is that the second end 3082 of the fixing member 308 of the backlight module 30" is fixed on an inner wall of the frame 306". Accordingly, it is unnecessary for this embodiment to form the second hole 3060 shown in FIG. 9 on one side of the frame 306' and it is also unnecessary for this embodiment to dispose the dustproof member 310 shown in FIG. 6. Furthermore, the frame 306" may have an accommodating space 3062 for accommodating the first protruding portion 3020 of the optical film assembly 302. The frame 306" may be made of plastic, metal or other appropriate materials. It should be noted that the same elements in FIG. 12 and FIGS. 3 to 10 are represented by the same numerals, so the repeated explanation will not be depicted herein.

Figure 13:
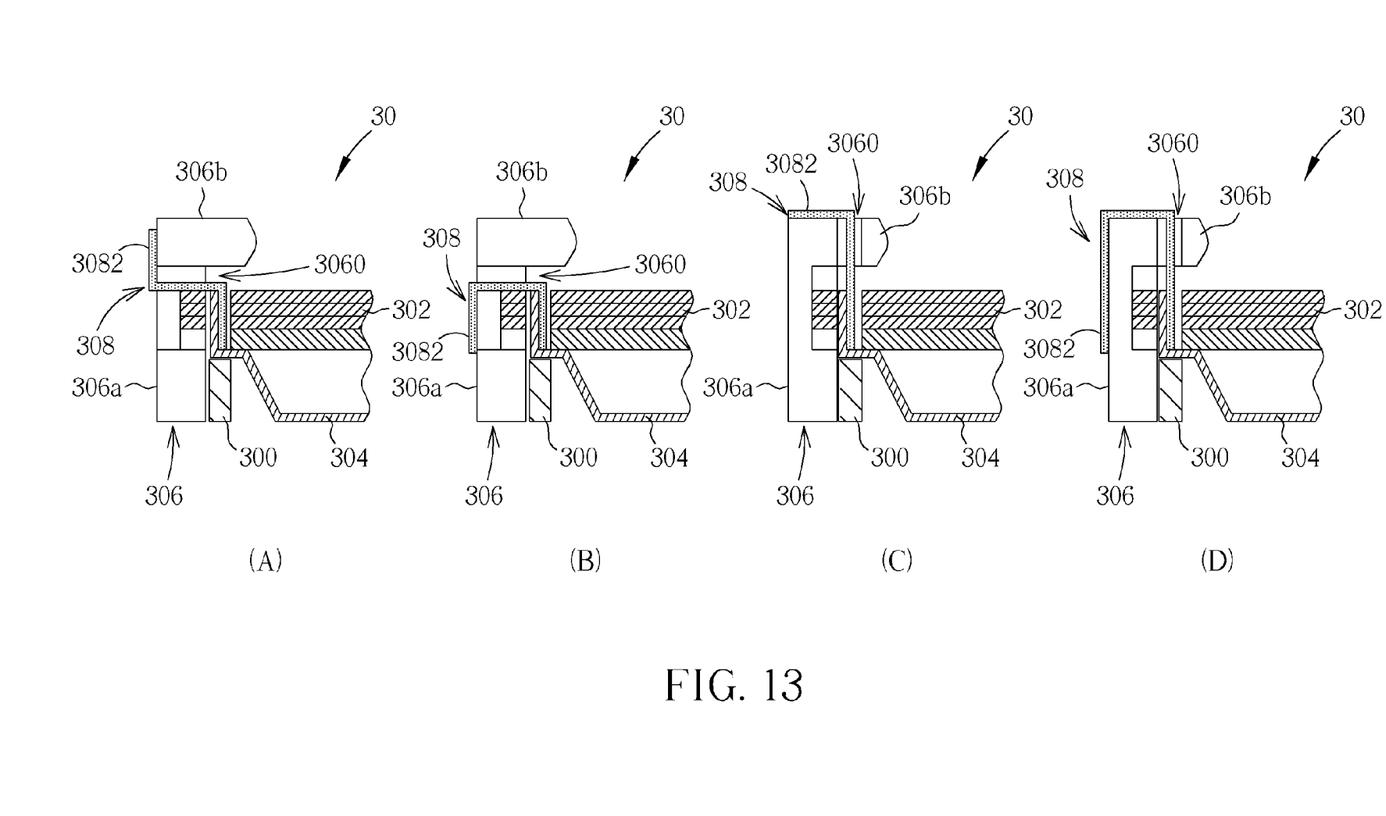
FIG. 13 is a schematic diagram illustrating sections of four types of the backlight modules according to different embodiments.

Referring to FIG. 13, FIG. 13 is a schematic diagram illustrating sections of four types of the backlight modules 30 according to different embodiments. As shown in FIG. 13, the frame 306 of the backlight module 30 may have a long edge 306a and a short edge 306b. The long edge 306a is fixed beside the back cover 300 and the short edge 306b is extended from the long edge 306a and located over the optical film assembly 302. The second hole 3060 is selectively formed on the long edge 306a or the short edge 306b. As shown in FIG. 13(A) and FIG. 13(B), the second hole 3060 is formed on the long edge 306a. As shown in FIG. 13(C) and FIG. 13(D), the second hole 3060 is formed on the short edge 306b. As shown in FIG. 13, no matter where the second hole 3060 is formed on, the second end 3082 of the fixing member 308 can pass through the second hole 3060 to be fixed on the outer wall of the frame 306.

Figure 14:
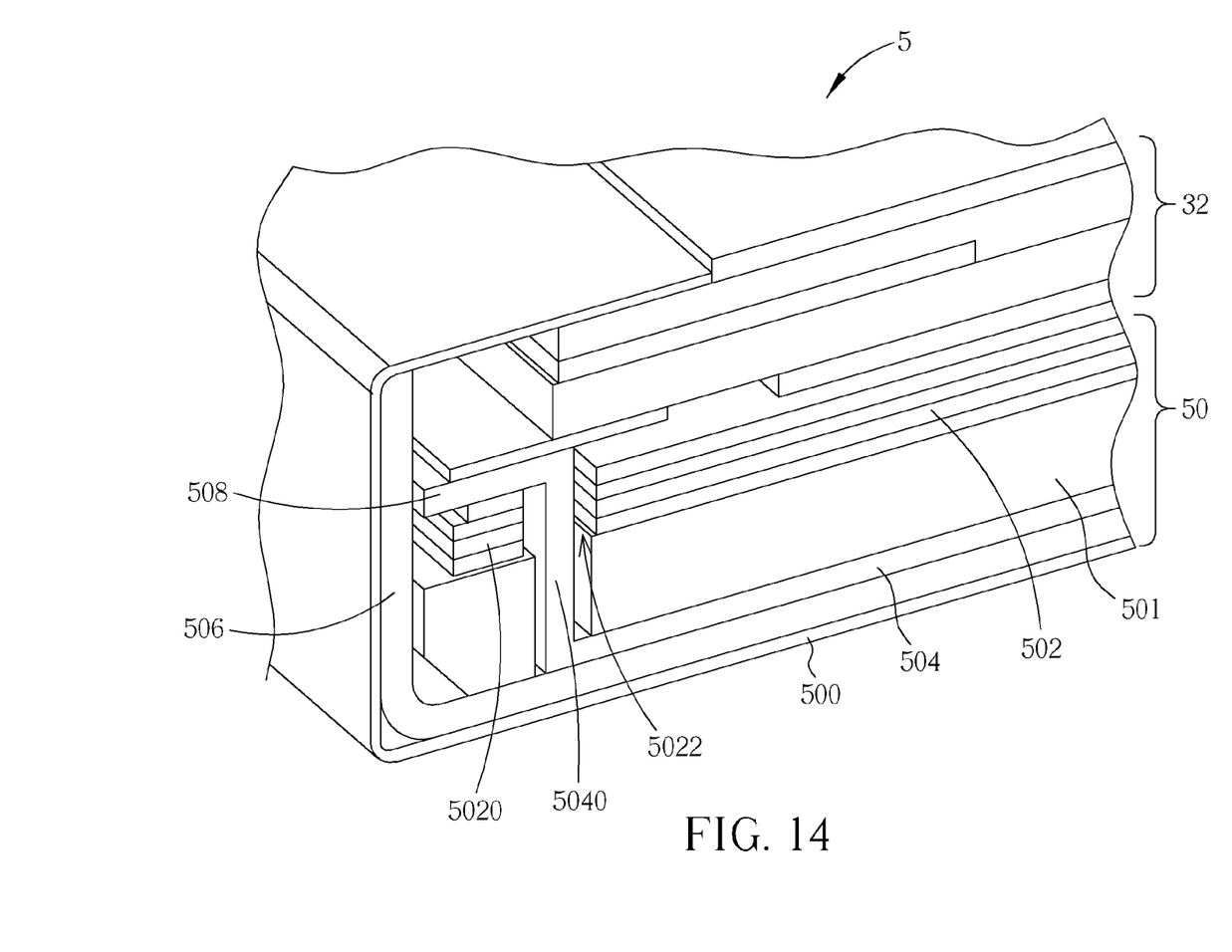
FIG. 14 is a partial view illustrating a display device according to another embodiment.

Referring to FIG. 14, FIG. 14 is a partial view illustrating a display device 5 according to another embodiment. As shown in FIG. 14, the main difference between the display device 5 and the aforesaid display device 3 is that the backlight module 50 of the display device 5 is a side light type backlight module. The display panel 32 is still disposed on the backlight module 50. The backlight module 50 comprises a back cover 500, a light guide plate 501, an optical film assembly 502, a reflective sheet 504, a frame 506 and a fixing member 508. In this embodiment, the optical film assembly 502 is disposed on the light guide plate 501 and the light guide plate 501 is disposed on the reflective sheet 504. It should be noted that the hardness of the light guide plate 501 is larger than the hardness of each film of the optical film assembly 502, so as to support the optical film assembly 502. The frame 506 may be made of plastic, metal or other appropriate materials.

The optical film assembly 502 has a first protruding portion 5020 and a first hole 5022 is formed on the first protruding portion 5020. The reflective sheet 504 is disposed between the back cover 500 and the optical film assembly 502. The reflective sheet 504 has a second protruding portion 5040 disposed in the first hole 5022 of the first protruding portion 5020. In this embodiment, the fixing member 508 and the second protruding portion 5040 of the reflective sheet 504 are formed integrally. In other words, the fixing member 508 is extended from the second protruding portion 5040 of the reflective sheet 504 and passes through the first hole 5022 of the optical film assembly 502 so as to be fixed on the optical film assembly 502 or the frame 506. Accordingly, the optical film assembly 502 can be fixed in the backlight module 50 effectively.

As mentioned in the above, the embodiment disposes the protruding portion of the reflective sheet in the hole formed on the protruding portion of the optical film assembly and fixes opposite ends of the fixing member on the reflective sheet and the frame beside the back cover respectively. Accordingly, the embodiment can fix the optical film assembly in the backlight module effectively.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backlight module comprising:
    a back cover;
    an optical film assembly disposed on the back cover, the optical film assembly having a first protruding portion, a first hole being formed on the first protruding portion;
    a reflective sheet disposed between the back cover and the optical film assembly, the reflective sheet having a second protruding portion disposed in the first hole of the first protruding portion;
    a frame disposed beside the back cover; and
    a fixing member, a first end of the fixing member being fixed on the second protruding portion of the reflective sheet and a second end of the fixing member being fixed on the frame.

2. The backlight module of claim 1, wherein the fixing member and the second protruding portion of the reflective sheet are formed integrally.

3. The backlight module of claim 1, wherein the fixing member is a film and the first end of the fixing member passes through the first hole of the first protruding portion to be fixed on the second protruding portion of the reflective sheet.

4. The backlight module of claim 1, wherein the frame has an accommodating space and the first protruding portion of the optical film assembly is accommodated in the accommodating space.

5. The backlight module of claim 1, wherein the second end of the fixing member is fixed on an inner wall of the frame.

6. The backlight module of claim 1, wherein a second hole is formed on the frame and the second end of the fixing member passes through the second hole to be fixed on an outer wall of the frame.

7. The backlight module of claim 6, wherein the frame has a long edge and a short edge, the long edge is fixed beside the back cover, the short edge is extended from the long edge and located over the optical film assembly, and the second hole is selectively formed on the long edge or the short edge.

8. The backlight module of claim 6, wherein the second hole is corresponding to one side of the optical film assembly and the first protruding portion of the optical film assembly is accommodated in the second hole.

9. The backlight module of claim 6, further comprising a dustproof member for covering the second hole.

10. A display device comprising:
    a backlight module comprising:
        a back cover;
        an optical film assembly disposed on the back cover, the optical film assembly having a first protruding portion, a first hole being formed on the first protruding portion;
        a reflective sheet disposed between the back cover and the optical film assembly, the reflective sheet having a second protruding portion disposed in the first hole of the first protruding portion;
        a frame disposed beside the back cover; and
        a fixing member, a first end of the fixing member being fixed on the second protruding portion of the reflective sheet and a second end of the fixing member being fixed on the frame; and
    a display panel disposed on the backlight module.

11. The display device of claim 10, wherein the fixing member and the second protruding portion of the reflective sheet are formed integrally.

12. The display device of claim 10, wherein the fixing member is a film and the first end of the fixing member passes through the first hole of the first protruding portion to be fixed on the second protruding portion of the reflective sheet.

13. The display device of claim 10, wherein the frame has an accommodating space and the first protruding portion of the optical film assembly is accommodated in the accommodating space.

14. The display device of claim 10, wherein the second end of the fixing member is fixed on an inner wall of the frame.

15. The display device of claim 10, wherein a second hole is formed on the frame and the second end of the fixing member passes through the second hole to be fixed on an outer wall of the frame.

16. The display device of claim 15, wherein the frame has a long edge and a short edge, the long edge is fixed beside the back cover, the short edge is extended from the long edge and located over the optical film assembly, and the second hole is selectively formed on the long edge or the short edge.

17. The display device of claim 15, wherein the second hole is corresponding to one side of the optical film assembly and the first protruding portion of the optical film assembly is accommodated in the second hole.

18. The display device of claim 15, wherein the backlight module further comprises a dustproof member for covering the second hole.

* * * * *